Feb. 13, 1968  A. G. CARTER  3,368,597
GUIDELINE PROJECTOR
Filed Nov. 9, 1964
5 Sheets-Sheet 1
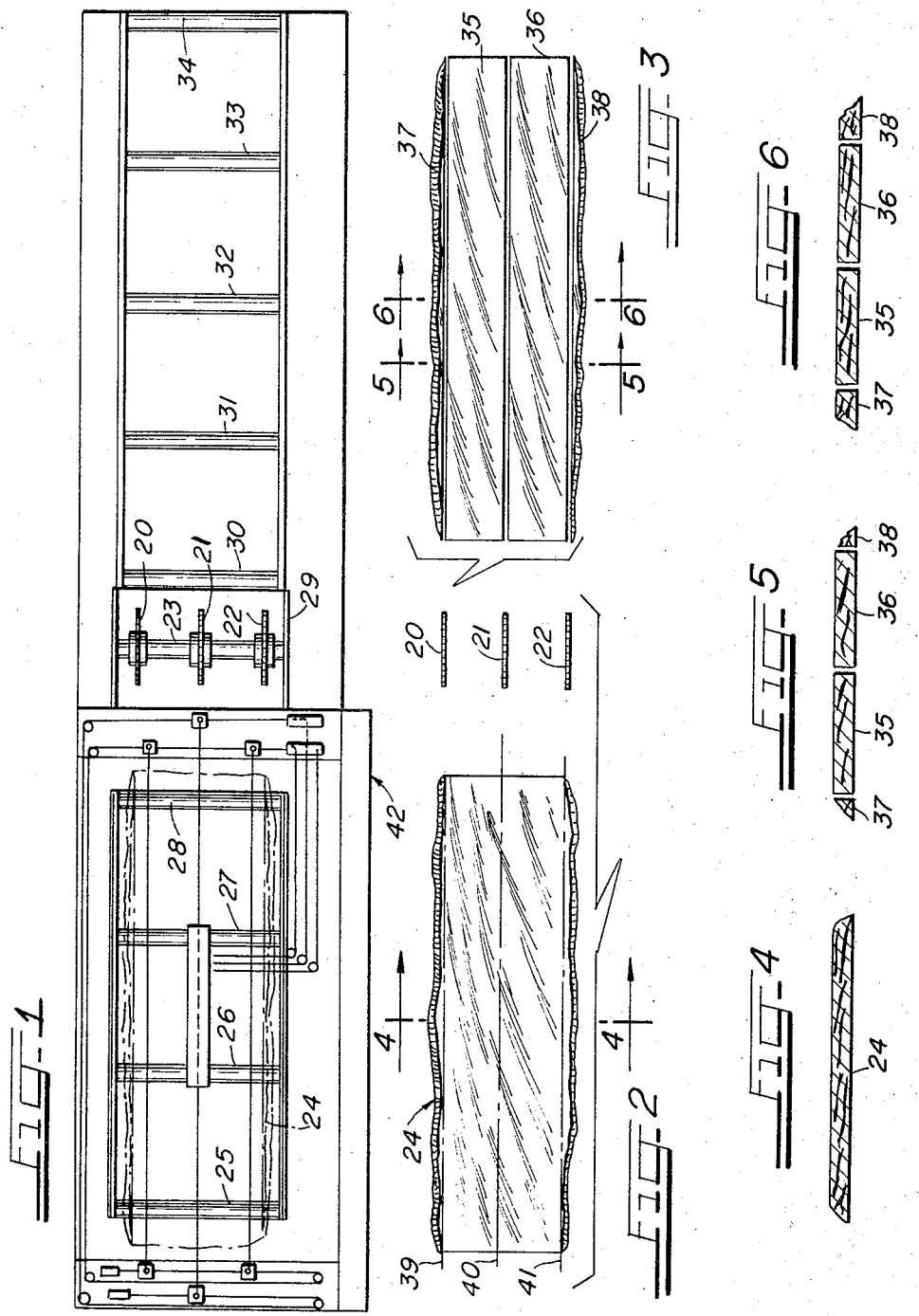
INVENTOR.
ANDREW G. CARTER
BY

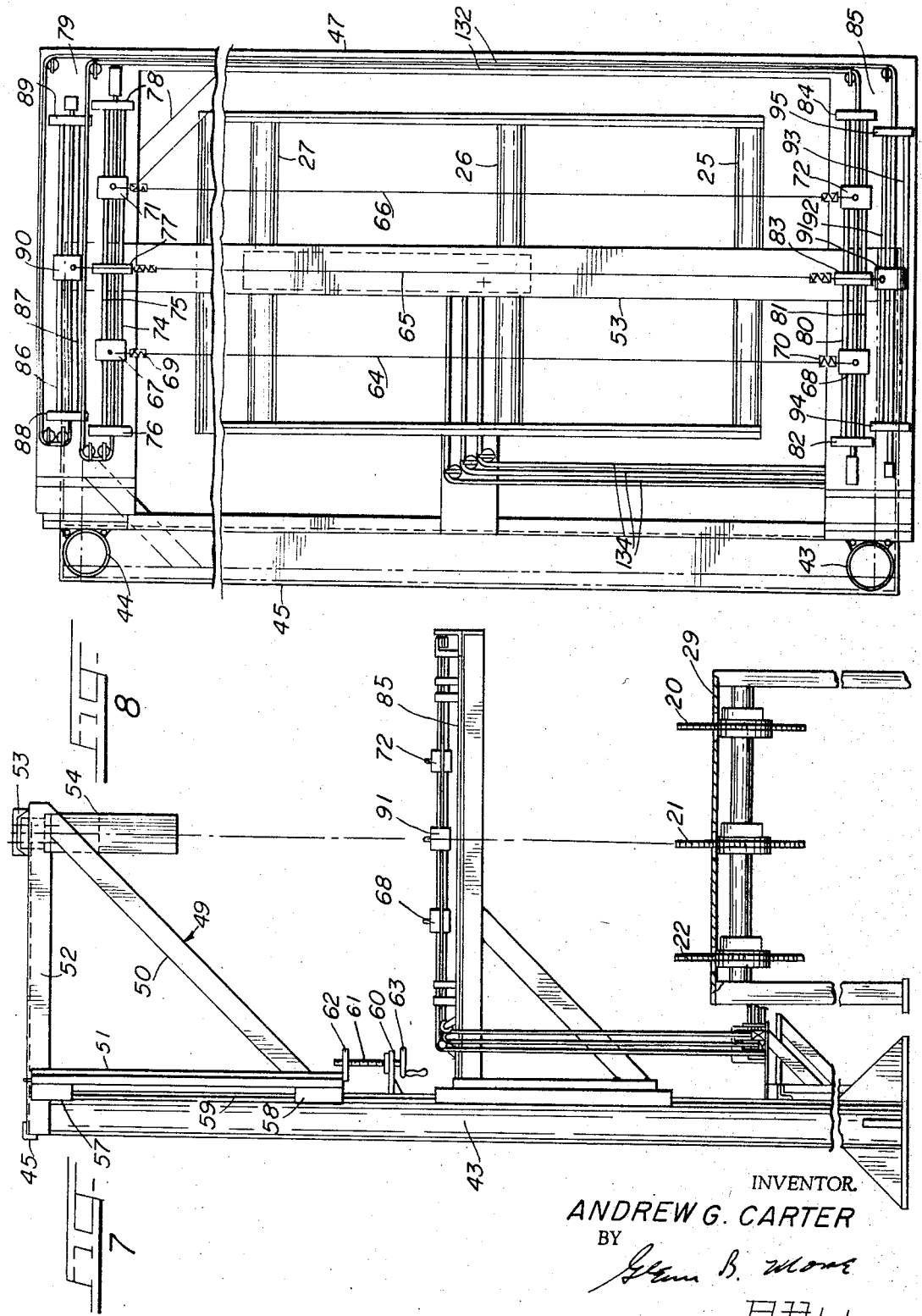

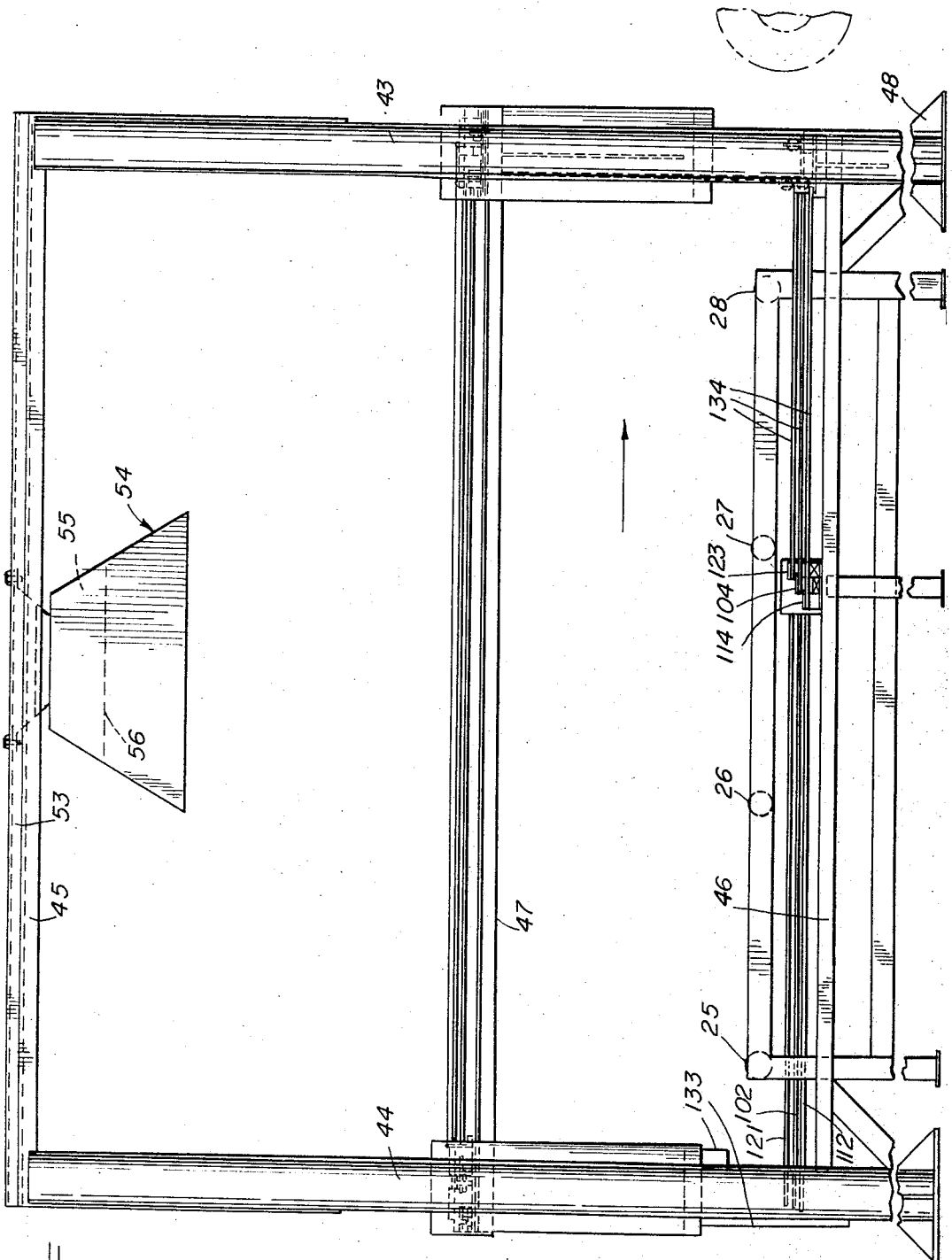

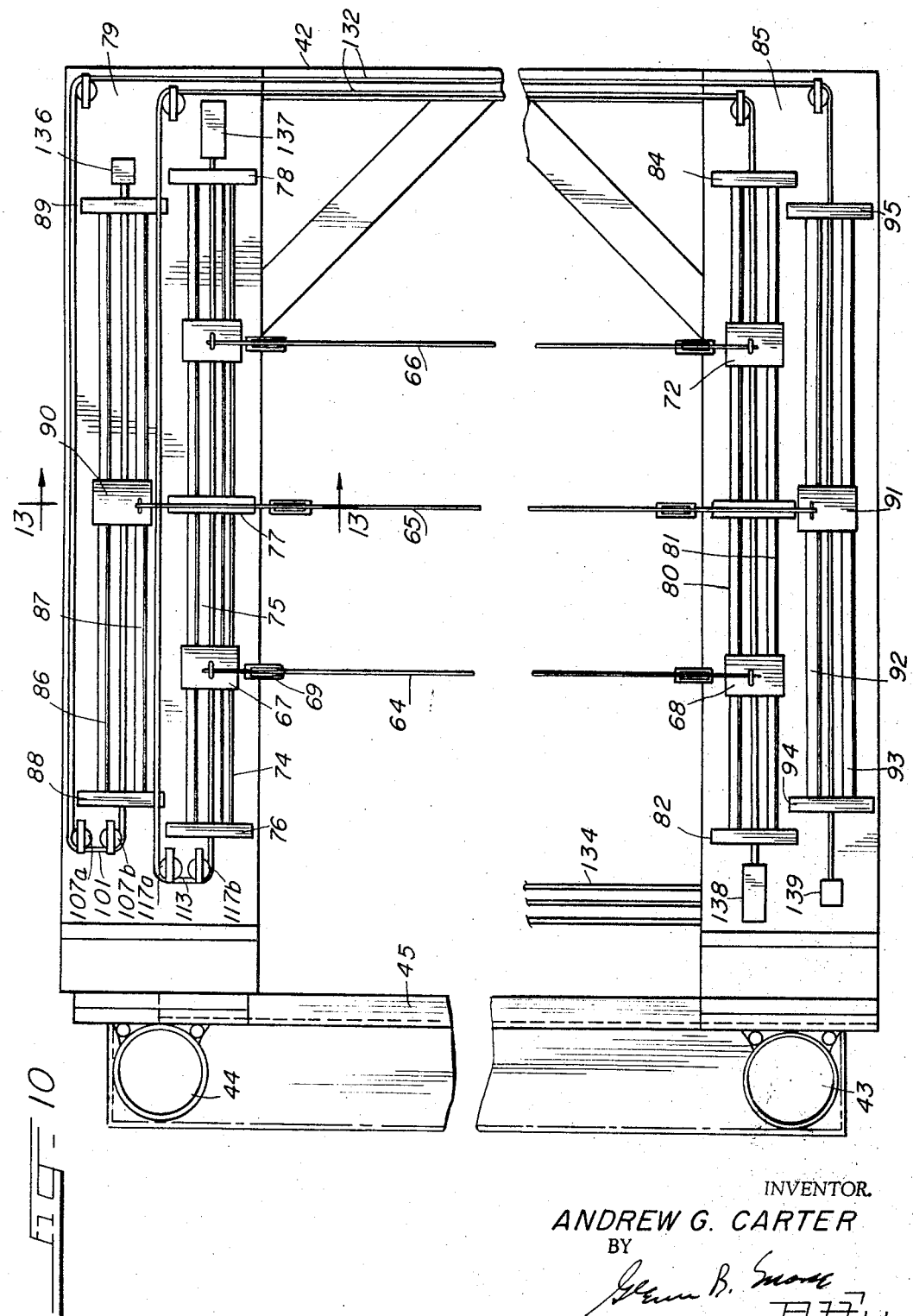

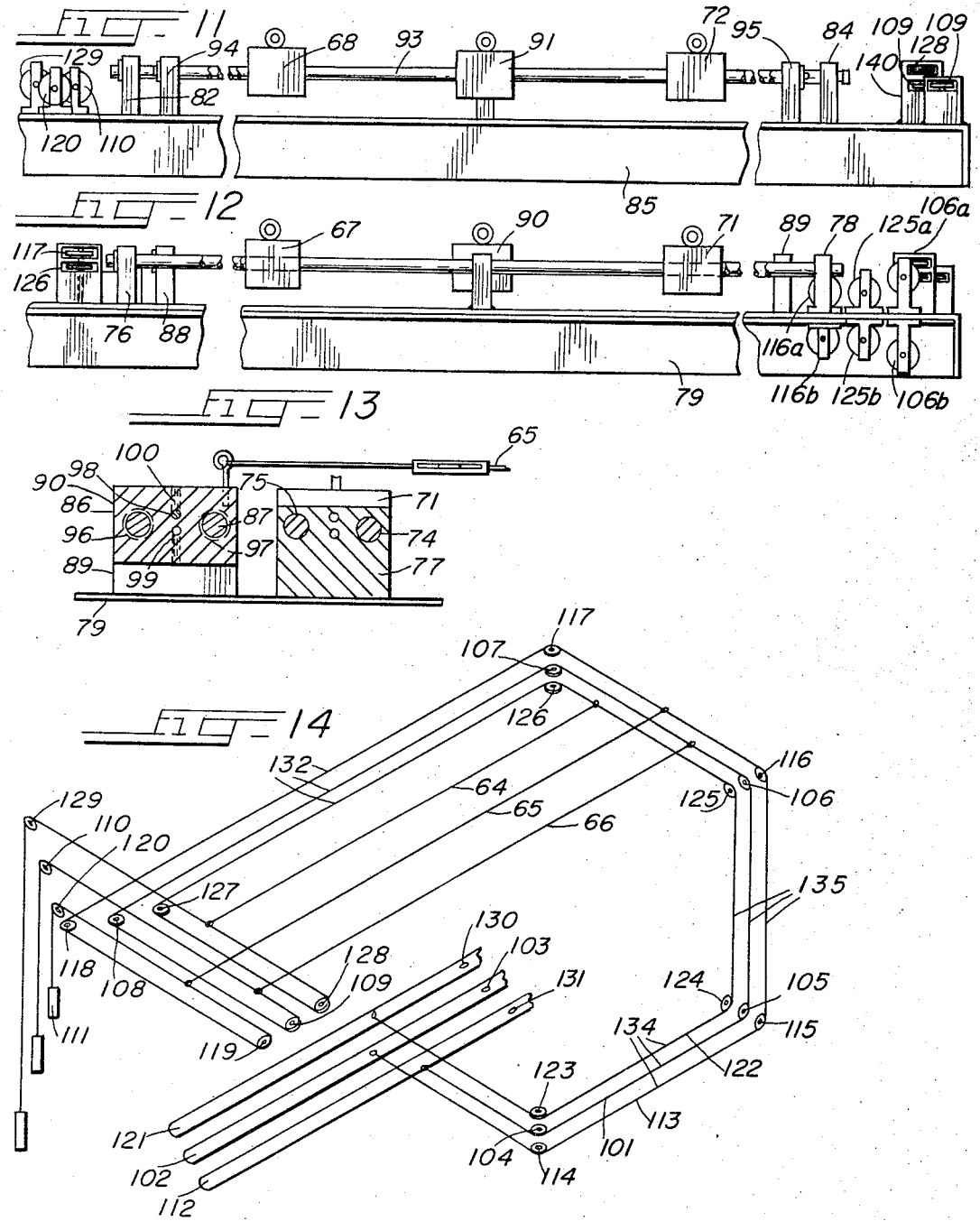

United States Patent Office 3,368,597
Patented Feb. 13, 1968

3,368,597
GUIDELINE PROJECTOR
Andrew G. Carter, 2930 Lake Drive SE.,
Grand Rapids, Mich. 49506
Filed Nov. 9, 1964, Ser. No. 409,906
9 Claims. (Cl. 143—168)

This invention provides a device for projecting a shadow line along a path followed by workpieces entering a machine. This shadow line will indicate the line along which the operating means of the machine will engage the workpiece. The invention has been developed primarily as a guide for rip saw operations in sawmills. The saw operator is always facing the problem of minimizing waste, and the operation where this is most critical is in the "second cutting" from the log. On the first cut, the log is "slabbed off" into pieces having bark on each edge, and showing the taper and other irregularities of the log. These pieces are sometimes known as "flitch-cut" boards. On the second cut, the operator must get the best rectangular boards he can out of the slabs.

Usually, the sawing machines will have a group of circular saws mounted for axial adjustment along a rotating arbor. The operator usually places a slab on the feed table, or conveyor, so that it is aligned generally parallel to the cutting plane of the saws. The saws are then adjusted laterally along the arbor to a position which will trim off the waste from the edges of the slab while removing as little good material as possible. The slabs may easily be 20 feet long, and the placement of the saws "by eye" from the far end of the slabs at the operator's station requires extreme skill and excellent eyesight. To avoid re-sawing, it is usual to allow for somewhat more scrap than would be necessary if more accurate placement were possible.

Shadowline devices have been used with these and other machines for throwing an image on the workpiece of the line of cut ahead of the saw (or whatever other operating unit may be characteristic of the machine). These devices have been of prohibitive cost, and have been excessively difficult to relate accurately to the machine controls. It is the primary purpose of this invention to provide a practical device for performing this function.

The several features of the invention will be analyzed in detail through a discussion of the particular embodiment illustrated in the accompanying drawings. In the drawings:

FIGURE 1 is a plan view showing the schematic arrangement of a sawing machine and a feeding table in conjunction with a guideline device embodying this invention.

FIGURE 2 illustrates a position of the shadowlines as they would fall on a slab prior to entrance into the sawing station.

FIGURE 3 ilustrates the sawn slab that has been separated into boards and trimmed along the lines indicated by the shadowline projector.

FIGURE 4 is a section of the plane 4—4 of FIGURE 2.

FIGURE 5 is a section along the plane 5—5 of FIGURE 3.

FIGURE 6 is a section along the plane 6—6 of FIGURE 3.

FIGURE 7 is an end elevation of the guideline projector in conjunction with a sawing machine.

FIGURE 8 is a plan view of the guideline projector.

FIGURE 9 is a side elevation of the guideline projector.

FIGURE 10 is a fragmentary top view of the guideline projector showing the carriers, and the cable arrangement for positioning the carriers and the line members extending between them.

FIGURE 11 is an end elevation of a portion of the guideway assembly shown at the right of FIGURE 10, viewed from the right, without the cables.

FIGURE 12 is an end elevation on the portion of the guideway assembly shown at the left of FIGURE 10, viewed from the right, without the cables.

FIGURE 13 is a fragmentary section on the plane 13—13 of FIGURE 10.

FIGURE 14 is a simplified schematic diagram showing the cable arrangement for positioning the line member carriers.

Referring particularly to FIGURES 1-6, the action of the sawmill centers in the circular saws 20, 21, and 22 which are mounted for rotation on the arbor 23. The saws are axially adjustable on the arbor in response to the usual controls manipulated by the operator to establish the line of cut at the desired position with respect to slabs 24 being fed into the machine along the feed table defined by the rollers 25-28. After passing through the sawing station generally indicated at 29 in the direction of movement to the right, as shown in FIGURE 1, the sawn boards and scrap are received on the roll-out table defined by the rollers 30-34. The sawmill itself is conventional in construction, and forms no part of this invention. Movement of the slab 24 through the sawing station 29 cuts the slab into the boards 35 and 36, and removes the scrap edge pieces 37 and 38. The dotted lines 39, 40, and 41 represent shadowlines cast on the slab 24 by the projector device generally indicated at 42 so that these lines conform exactly to the paths traversed by the saws 20-22. Through the use of the device, the operator may place the slab in the position shown in FIGURE 1, and manipulate the controls of the machine to place the saws 20-22 exactly as he wishes to produce the boards 35 and 36. As the operator manipulates his controls, the inter-relationship between the controls and the projector 42 will cause the lines 39-41 to precisely follow the adjustment of the saws 20-22 so that the operator can see exactly where the saws are going to engage the slab 24.

The general arrangement of the guideline projector 42 is best shown in FIGURES 7, 8, and 9. The frame of the device includes the vertical columns 43 and 44 interconnected by the members 45 and 46. Mounting flanges as shown at 48 on the columns 43 and 44 are normally bolted to the floor to secure the device in position.

A triangular structure generally indicated at 49 is adjustably mounted for vertical movement on both of the columns 43 and 44. Each of these triangular structures includes a diagonal member 50, a vertical member 51, and a top horizontal 52. A horizontal rail 53 interconnects the outer extremities of the triangular structures 49 to provide the support for the light source 54. This light source will normally contain a filament tube in the chamber 55, and a slotted panel 56 which will result in throwing an intense beam of light downwardly on to the feed table of the sawmill.

The position of the light source is vertically adjustable through the sliding engagement of the shoes 57 and 58 (on each of the vertical members 51) with the plates 59 mounted on each of the columns 43 and 44. A fixed plate 60 is secured to the columns to act as a base for the adjusting screws 61, with the screw 61 being rotatable but axially fixed with respect to the abutment plate 60. The screws have threaded engagement with the plate 62 secured to the triangular structure 49, with the result that rotation of the wheel 63 will induce vertical movement of the triangular structure 49. Corresponding adjustment at opposite ends of the machine will produce movement of the light source 54 to the correct vertical position. The screws 61 may, if desired, be correlated by a suitable shaft extending between the columns 43, and driving the screws through conventional bevel gear arrangements.

The shadowlines 39, 40, and 41 are produced by the interception of the light from the light source 54 by the wires 64, 65, and 66, respectively. The wire 64 extends between the carriers 67 and 68, with springs or equivalent tension devices being incorporated as shown at 69 and 70 to maintain the wire 64 under enough tension to provide a straight line without substantial vertical deviation or large-amplitude vibration. The wire 66 is similarly mounted on the carriers 71 and 72, and the carriers 67 and 71 are both laterally movable along the guideway provided by the parallel rods 74 and 75. These rods are supported in the blocks 76–78 mounted on the arm structure 79, and the carriers 68 and 72 are similarly mounted on the rods 80 and 81 carried in the blocks 82–84 mounted on the opposite arm structure 85. The rods 86 and 87 form another guideway in the arm structure 79, and are mounted in the blocks 88 and 89 for supporting the central carrier 90. The opposite central carrier 91 is supported on the rods 92 and 93 mounted on the arm structure 85 in the blocks 94 and 95.

Coordination of the movement of the carriers is obtained through a cable system schematically illustrated in FIGURE 14. The manner of connecting the control cables to the carriers is best shown in FIGURE 13. The carriers preferably engage the guide rods with bushings as shown at 96 and 97, and a pair of central holes 98 and 99 are provided to accommodate cables arranged parallel to the guide rods. For convenience, the carriers are all constructed alike, although only one of the holes 98 or 99 will be used on the carriers where a single carrier occupies the guide rods. This will apply to the carriers 90 and 91. The cable is locked to the carrier by a set screw 100 so that movement of that cable is communicated to the carrier. Where there are two carriers on one guideway, one of the cables will be locked by a set screw as shown in FIGURE 13, with the other cable moving freely through the hole. The cable 113 extends from a point of connection on the control arm 102 used by the operator to position the central saw 21, and this cable proceeds around the pulleys 114–120 to the weight 111. This weight maintains a fixed tension in the cable, and eliminates the need for a complete return run of each cable. Movement to the right of the handle 102 will cause rotation of the handle about the fulcrum 103, and movement to the left of the saw 21. A similar direction of movement of the wire 65 is obtained by the cable routing shown in FIGURE 14, with both ends of the wire 65 moving in the same direction. Movement of the handle 112 is communicated to the shadowline wire 66 through the cable 101 as it extends around the pulleys 104–110.

The control lever 121 positions the wire 64 through the cable 122 extending around the pulleys 123–129. Separate weights as shown at 111 are attached to each of the cables. The schematic diagram shown at FIGURE 14 is simplified somewhat in its arrangement over the connections actually in use on the machine, and the specific location of these pulleys on the frame structure of the machine may be subject to wide variation according to choice. The location of the fulcra 103, 130, and 131 are carefully related to the points of connection of the cables 101, 113, and 122 so that the amount of movement of the saw produces an exactly similar movement of the shadow line, with proper allowance being made for the fact that the movement of the wires 64–66 will produce an increased movement of the shadow line in the ratio of (a) the distance between the workpiece and the light source, to (b) the distance between the wire and the light source. The compensation for varying thicknesses of workpieces (which would vary the vertical position of the top surface on which the shadow line appears) is by the adjustment wheel 63. A thicker workpiece would require a lowering of the light source 54 in order to preserve the proper ratio of movement between the wire and the shadow line.

In the preferred construction illustrated in the drawings, the simplified schematic arrangement shown in FIGURE 14 is modified by including return runs on certain sections of cable, and by the doubling of certain of the pulleys shown in FIGURE 14 in order to provide clearance and for convenience of installation. The pulley 107 of FIGURE 14, in the machine, becomes the two pulleys 107a and 107b of FIGURE 10. Pulleys 117 and 126 are similarly doubled so that they can be spaced apart, and corresponding members of each of these pairs are stacked one above the other so that the cable 113 is disposed directly above the cable 122 in the arm structure 79. This arrangement permits these cables to proceed through the holes in the carriers as indicated at 98 and 99 in FIGURE 13. For convenience, the group of cables indicated at 132 may be positioned within the hollow interior of the frame rail 47, and the portions of the cables leading to the weights 111 may be disposed adjacent either one of the columns, with the weights themselves shielded within housings as shown at 133 in FIGURE 9. The cable group 134 is conveniently disposed as shown in FIGURE 9 where the pulleys 123, 104 and 114 may be properly located to bring the points of connection at the correct position along the long positioning levers 102, 112, and 121 which extend underneath the rollers 25–28 to control the lateral position of the saws 20–22. The operator's station may be considered as at the left extremity of FIGURE 9.

The cable group 135 is conveniently led back underneath the ram structure 79 by the vertically spaced pulleys 125a–b, 106a–b, and 116a–b to where it may extend downward in proximity to one of the columns. Protective housing as shown at 136–139 in FIGURE 10, are provided for the vertical plane pulleys, and the form of housings as shown at 136–139 in FIGURE 10, are pro-horizontal pulleys. The specific arrangement of the pulleys may be altered within the principle shown in FIGURE 14, in which similarly-moving lengths of the same cable are used to move related carriers. The particular location of the operator's station, and the space available at around the sawmill will also affect the positions of the pulleys and frame components.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. In combination with a machine having means receiving workpieces for movement along a path in a particular direction, said machine having operating means for engaging said workpieces at least at one variable position within the width of said path, a guide device comprising:

a frame having parallel guideways disposed substantially horizontally and transversely to and above said path, said guideways being formed by parallel rods;

a light source mounted for vertical adjustment on said frame above and between said guideways, said light source being adapted to project a beam of light downwardly on said path;

at least one pair of opposite carriers mounted in said guideways, respectively, said carriers including blocks slidably engaging said rods, said blocks having means for connection to said line members, and also having at least one hole parallel to said guide ways and a member adjustably intersecting said hole;

a line member extending between said carriers; and positioning means for selectively moving said carriers in said guideways in a related movement whereby said line member remains parallel to the direction of said path; and control means relating said positioning means to said machine whereby said line member projects a shadow line on said path projected ahead of said operating means.

2. In combination with a machine having means receiving workpieces for movement along a path in a particular direction, said machine having operation means for engaging said workpieces at least at one variable position within the width of said path, a guide device comprising:
a frame having parallel guideways disposed substantially horizontally and transversely to and above said path;
a light source mounted for vertical adjustment on said frame above and between said guideways, said light source being adapted to project a beam of light downwardly on said guideways, respectively;
a line member extending between said carriers; and
positioning means for selectively moving said carriers in said guideways in a related movement whereby said line member remains parallel to the direction of said path; and
control means relating said positioning means to said machine whereby said line member projects a shadow line on said path projected ahead of said operating means,
said positioning means includes cable means positioned by pulleys mounted on said frame whereby runs of cable are disposed parallel to said guideways and selectively connected to said carriers so that opposite carriers move together at opposite ends of a particular line member.

3. A device as defined in claim 1, wherein said carriers have a pair of holes parallel to said guideways, the said holes being intersected by threaded holes.

4. A device as defined in claim 3, wherein portions of said cables are received in said carrier block holes, and certain of said cable portions are locked with respect to particular carrier blocks by a screw engaging the threaded holes intersecting the carrier block holes traversed by said cable portions.

5. A guide device comprising:
a frame having parallel guideways;
a light source mounted for vertical adjustment on said frame above and between said guideways, said light source being adapted to project a beam of light between said guideways and transversely thereto;
at least one pair of opposite carriers mounted in said guideways, respectively;
a line member extending between said carriers; and
positioning means for selectively moving said carriers in said guideways in a related movement whereby said line member assumes parallel positions, said positioning means including cable means positioned by pulleys mounted on said frame whereby runs of cable are disposed parallel to said guideways and selectively connected to said carriers so that opposite carriers move together at opposite ends of a particular line member.

6. A guide device comprising:
a frame having parallel guideways each formed by parallel rods;
a light source mounted for vertical adjustment on said frame above and between said guideways, said light source being adapted to project a beam of light between said guideways and transversely thereto;
at least one pair of opposite carriers mounted in said guideways, respectively, said carriers each including a block slidably engaging said rods, said blocks having at least one hole parallel to said guideways, and a member adjustably intersecting said hole;
a line member extending between said carriers and connected to said blocks; and
positioning means, including cable portions traversing said holes, for selectively moving said carriers in said guideways in a related movement whereby said line member assumes parallel positions.

7. A device as defined in claim 6, wherein said carriers have a pair of holes parallel to said guideways, the said holes being intersected by threaded holes.

8. A device as defined in claim 7, wherein portions of said cables are received in said carrier block holes, and certain of said cable portions are locked with respect to particular carrier blocks by a screw engaging the threaded holes intersecting the carrier block holes traversed by said cable portions.

9. A guide device comprising:
a frame having parallel guideways;
a light source mounted on said frame above and between said guideways, said light source being adapted to project a beam of light between said guideways and transversely thereto;
at least one pair of opposite carriers mounted in said guideways, respectively;
a line member extending between said carriers; and
positioning means for selectively moving said carriers in said guideways in a related movement whereby said line member assumes parallel positions, said positioning means including cable means positioned by pulleys mounted on said frame whereby runs of cable are disposed parallel to said guideways and selectively connected to said carriers so that opposite carriers move together at opposite ends of a particular line member.

References Cited
UNITED STATES PATENTS

| | | | |
|---|---|---|---|
| 1,786,925 | 12/1930 | Wiegelmann | 143—168 |
| 2,510,471 | 6/1950 | Horstkotte | 143—168 |
| 3,225,800 | 12/1965 | Pease | 143—37 |

FOREIGN PATENTS

| | | |
|---|---|---|
| 42,970 | 9/1926 | Norway. |
| 88,673 | 3/1937 | Sweden. |

DONALD R. SCHRAN, *Primary Examiner.*